(12) United States Patent
Lin

(10) Patent No.: US 8,386,205 B2
(45) Date of Patent: Feb. 26, 2013

(54) ROTATIONAL VIBRATION TEST SYSTEM AND METHOD

(75) Inventor: Sheng-Han Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 482 days.

(21) Appl. No.: 12/764,937

(22) Filed: Apr. 21, 2010

(65) Prior Publication Data

US 2011/0138227 A1 Jun. 9, 2011

(30) Foreign Application Priority Data

Dec. 8, 2009 (CN) .......................... 2009 1 0311036

(51) Int. Cl.
G01D 3/00 (2006.01)

(52) U.S. Cl. ..................................................... 702/108
(58) Field of Classification Search .................. 702/108
See application file for complete search history.

(56) References Cited

U.S. PATENT DOCUMENTS 7,171,589 B1 * 1/2007 Urmanov et al. ............ 714/47.1

* cited by examiner

Primary Examiner — Stephen Cherry
(74) Attorney, Agent, or Firm — Altis Law Group, Inc.

(57) ABSTRACT

A rotational vibration test system and method of a storage system set storage devices of the storage system, fan speeds of an electric fan of the storage system, and access patterns of the storage system. The electric fan is controlled to run at the fan speeds. The storage system is accessed according to the access patterns. Accordingly, the storage devices are input/output performance tested. Test results of the storage devices are output to an output device.

15 Claims, 3 Drawing Sheets

ROTATIONAL VIBRATION TEST SYSTEM AND METHOD

BACKGROUND

1. Technical Field

Embodiments of the present disclosure relate to storage systems and methods, and particularly to a rotational vibration test system and method of a storage system.

2. Description of Related Art

Due to the mechanical nature of storage devices (e.g., hard disks) and electric fans of a storage system, rotational vibration is generated in the storage system when the storage system is accessed. The rotational vibration can degrade input/output (IO) performance of the storage system. Therefore, it is desirable to perform rotational vibration tests on the storage system.

DETAILED DESCRIPTION

In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

Figure 1:
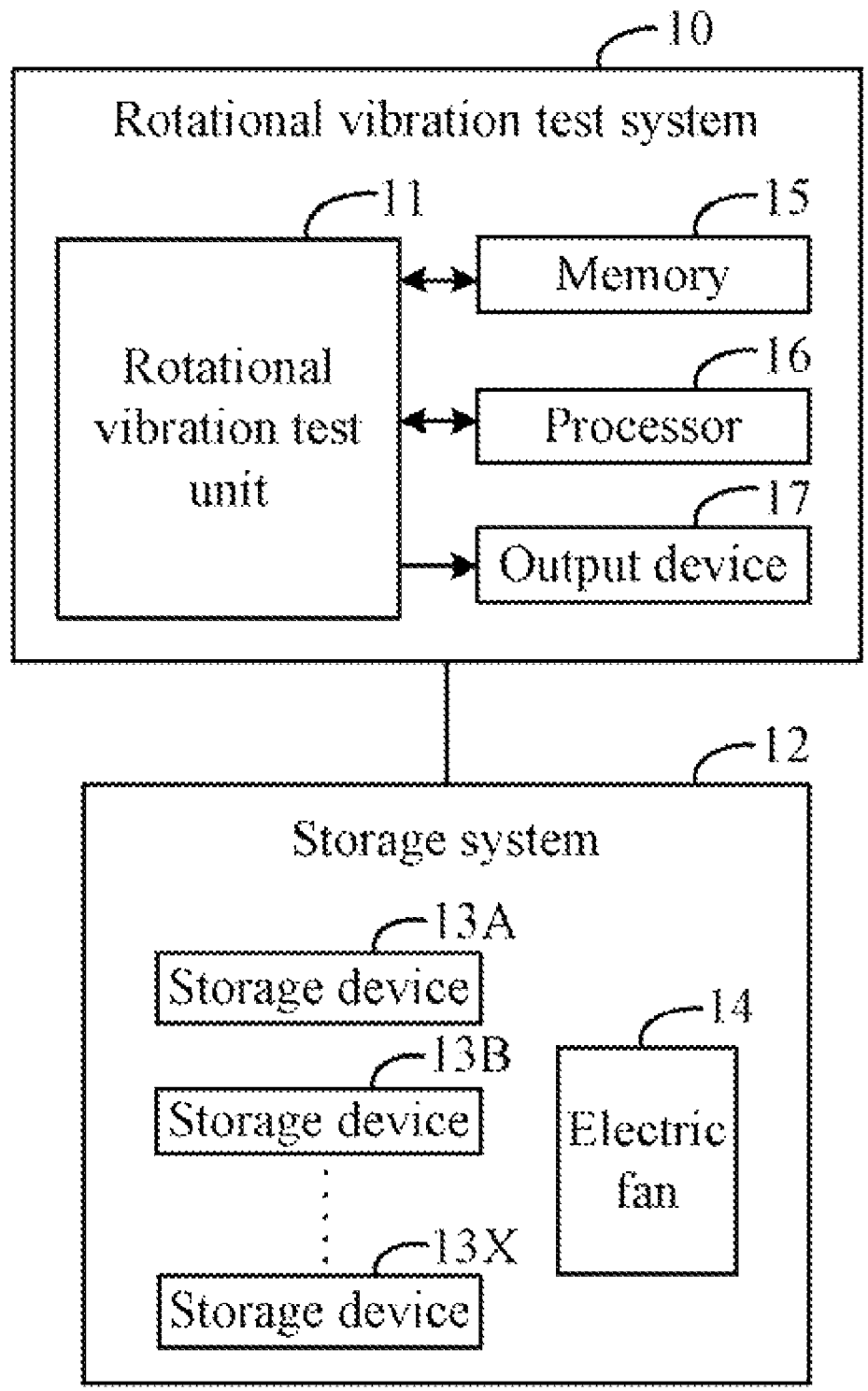
FIG. 1 is a block diagram of one embodiment of a rotational vibration test system of a storage system.

FIG. 1 is a block diagram of one embodiment of a rotational vibration test system 10 of a storage system 12. The test system 10 is connected to the storage system 12. The storage system 12 includes a plurality of storage devices, such as storage devices 13A-13X shown in FIG. 1, and an electric fan 14. Each of the storage devices may be a magnetic or optical storage device, such as a hard disk drive, an optical drive, or a tape drive. Due to the mechanical nature of the storage devices and the electric fan 14, rotational vibration may be generated when the test system 10 performs write or read operations on the storage system 12.

In one embodiment, the test system 10 may include a rotational vibration test unit 11, a memory 15, a processor 16, and an output device 17. One or more computerized codes of the rotational vibration test unit 11 may be stored in the memory 15 and executed by the processor 16. The output device 17 may be a display screen or a printer, which outputs a test result of the storage system 12 to a user.

Figure 2:
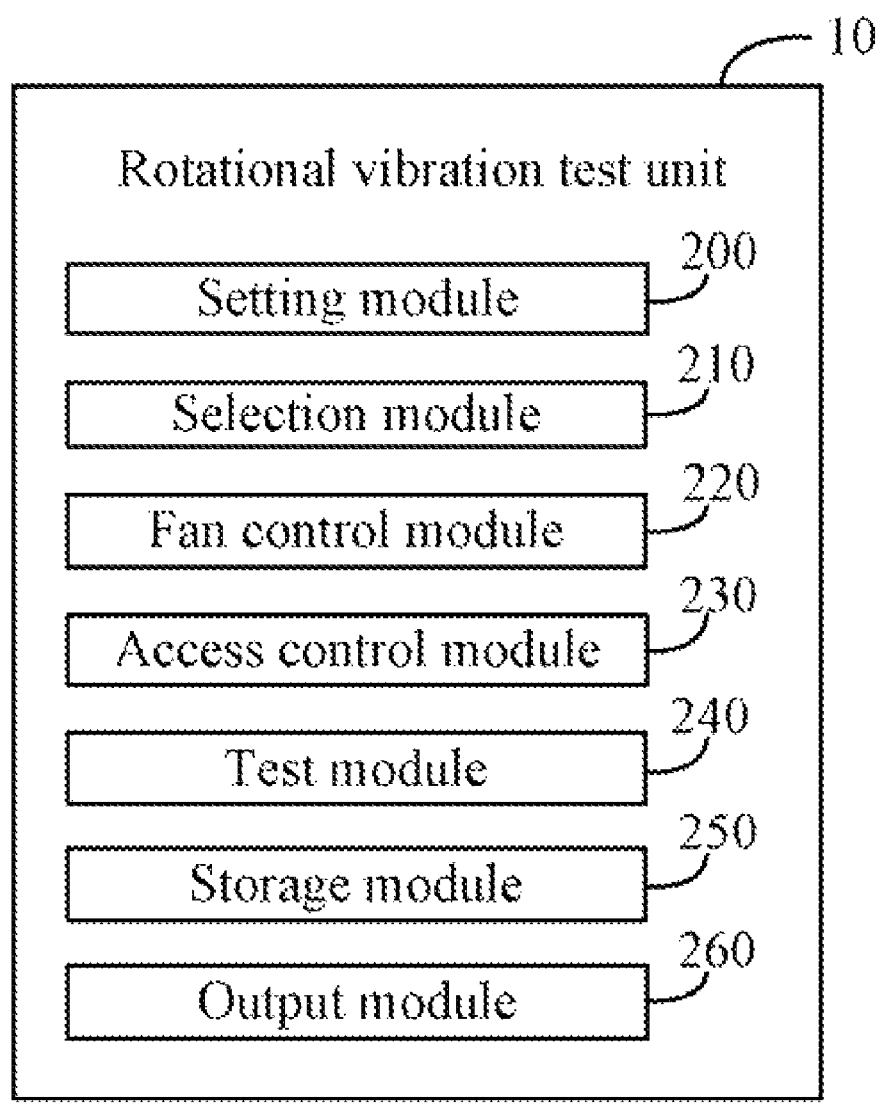
FIG. 2 is a block diagram of one embodiment of a rotational vibration test unit in FIG. 1.

FIG. 2 is a block diagram of the rotational vibration test unit 11 in FIG. 1. In one embodiment, the rotational vibration test unit 11 includes a setting module 200, a selection module 210, a fan control module 220, an access control module 230, a test module 240, a storage module 250, and an output module 260.

The setting module 200 sets a plurality of test parameters of the storage system 12. In one embodiment, the test parameters include storage devices of the storage system 12 under test, fan speeds of the electric fan 14, and access patterns of the storage system 12. The storage devices under test may be just some or all of the storage devices in the storage system 12, such as just the storage devices 13A-13D, or all the storage devices 13A-13X. The access patterns, such as 64 KB random write and 4 KB random read, represent different data traffic of the storage system 12 in actual applications. For the access pattern of 64 KB random write, a size of data blocks transferred to the storage system 12 is 64 KB.

The selection module 210 selects the storage devices under test one by one.

The fan control module 220 selects the fan speeds one by one, and controls the electric fan 14 to run at the selected fan speed. For example, the fan control module 220 selects a fan speed of 1200 revolutions per minute (RPM), and controls the electric fan 14 to run at the selected fan speed of 1200 RPM.

The access control module 230 selects the access patterns one by one, and performs read/write operations on the storage system 12 according to the selected access pattern. For example, the access control module 230 selects an access pattern of 4 KB random write, and performs 4 KB random write operations on the storage system 12.

The test module 240 tests IO performance of the selected storage device. In one embodiment, the test module 240 measures input/output operations per second (IOPS) of the selected storage device to determine the IO performance of the selected storage device.

The storage module 250 stores test results in the memory 15.

The output module 260 outputs the test results to the output device 17.

Figure 3:
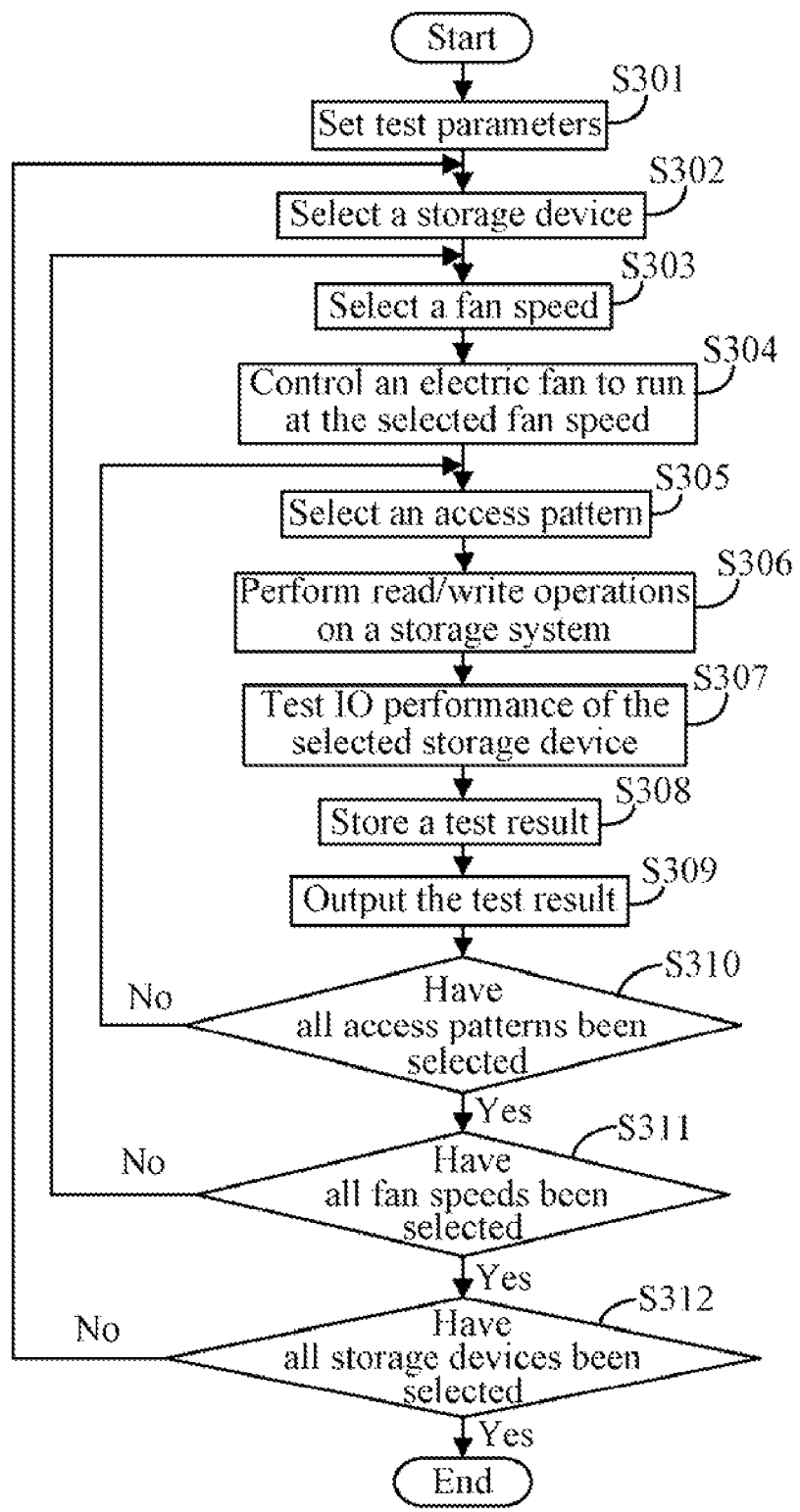
FIG. 3 is a flowchart of one embodiment of a rotational vibration test method of a storage system implementing a system, such as that of FIG. 1.

FIG. 3 is a flowchart of one embodiment of a method for testing rotational vibration in a storage system (e.g., the storage system 12) implementing a system, such as that in FIG. 1. Depending on the embodiments, additional blocks may be added, others removed, and the ordering of the blocks may be changed.

In block S301, the setting module 200 sets a plurality of test parameters of the storage system 12. In one embodiment, the test parameters include storage devices under test of the storage system 12, fan speeds of the electric fan 14, and access patterns of the storage system 12. In one example, the storage devices under test may be the storage devices 13A-13X. The fan speeds may include 1200 RPM, 2400 RPM, and 3600 RPM. The access patterns may include 4 KB random write, 64 KB random write, 256 KB random write, 256 KB sequential, 4 KB random read, 64 KB random write, and 256 KB random write.

In block S302, the selection module 210 selects one of the storage devices under test. In one example, the selection module 210 selects the storage device 13A.

In block S303, the fan control module 220 selects one of the fan speeds. In one example, the fan control module 220 selects the fan speed of 1200 RPM.

In block S304, the fan control module 220 controls the electric fan 14 to run at the selected fan speed, such as the selected fan speed of 1200 RPM. In one embodiment, the fan control module 220 generates a speed control command according to the selected fan speed, and sends the speed control command to the electric fan 14. In response to the speed control command, the electric fan 14 runs at the selected fan speed.

In block S305, the access control module 230 selects one of the access patterns. In one example, the access control module 230 selects an access pattern of 4 KB random write.

In block S306, the access control module 230 performs read/write operations on the storage system 12 according to the selected access pattern. In one embodiment, the access control module 230 may perform the read/write operations on the selected storage device according to the selected access pattern. For example, the access control module 230 performs 4 KB random write operations on the selected storage device 13A. In another embodiment, the access control module 230 may perform the read/write operations on all the storage devices under test according to the selected access pattern. For example, the access control module 230 performs 64 KB random write operations on the storage devices 13A-13X.

In block S307, the test module 240 tests input/output (I/O) performance of the selected storage device. In one embodiment, the test module 240 may measure IOPS of the selected storage device. For example, the test module 240 measures the IOPS of the selected storage device when the electric fan 14 runs at 1200 RPM and the selected storage device is accessed in a selected access pattern of 4 KB random write. Depending on the embodiment, the test module 240 may measure a data transfer rate (MB/s) of the selected storage device. The test module 240 may test the IO performance more than once, such as six times, and accordingly calculates a mean value of the IO performance. For example, the test module 240 measures the IOPS of the selected storage device six times to obtain six IOPS values of 234.67, 234.05, 234.34, 234.43, 234.38, and 234.41, thus a mean value of 234.38 is calculated.

In block S308, the storage module 250 stores a test result of the selected storage device to the memory 15. In one embodiment, the storage module 250 stores the test result, such as the six IOPS values of 234.67, 234.05, 234.34, 234.43, 234.38 and 234.41, in a predetermined storage path, such as F:\RVTest\Result.

In block S309, the output module 260 outputs the test result of the selected storage device to the output device 14. In one embodiment, the output device 14 is a display screen. Accordingly, the output module 260 outputs the test result of the selected storage device to the display screen. For example, the output module 260 displays the six IOPS values of 234.67, 234.05, 234.34, 234.43, 234.38 and 234.41, and a mean value of 234.38 on the display screen.

In block S310, the test module 240 determines if all the access patterns have been selected. If there are any other access patterns that have not been selected, the flow returns to block S305.

Otherwise, if all the access patterns have been selected, in block S311, the test module 240 determines if all the fan speeds have been selected. If there are any other fan speeds that have not been selected, the flow returns to block S303.

Otherwise, if all the fan speeds have been selected, in block S312, the test module 240 determines if all the storage devices under test have been selected. If there are any other storage devices under test have not been selected, the flow returns to block S302. Otherwise, if all the storage devices under test have been selected, the flow ends.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A rotational vibration test system of a storage system comprising storage devices and an electric fan, the test system comprising:
   a memory;
   at least one processor; and
   a rotational vibration test unit being stored in the memory and executable by the at least one processor, the rotational vibration test unit comprising:
   a setting module operable to set a plurality of test parameters of the storage system, the test parameters comprising storage devices of the storage system under test, fan speeds of the electric fan, and access patterns of the storage system;
   a selection module operable to select the storage devices under test one by one;
   a fan control module operable to select the fan speeds one by one and control the electric fan to run at the selected fan speed;
   an access control module operable to select the access patterns one by one and perform read/write operations on the storage system according to the selected access pattern;
   a test module operable to test input/output performance of the selected storage device; and
   an output module operable to output a test result of the selected storage device to an output device.

2. The test system of claim 1, wherein the rotational vibration test unit further comprises a storage module operable to store the test result of the selected storage device into the memory.

3. The test system of claim 1, wherein each of the storage devices is a hard disk drive, an optical drive, or a tape drive.

4. The test system of claim 1, wherein the access control module performs the read/write operations on the selected storage device or all the storage devices according to the selected access pattern.

5. The test system of claim 4, wherein the test module measures input/output operations per second and/or a data transfer rate of the selected storage device to determine the input/output performance of the selected storage device.

6. A rotational vibration test method of a storage system comprising storage devices and an electric fan, the method comprising:
   (a) setting a plurality of test parameters of the storage system, the test parameters comprising storage devices of the storage system under test, fan speeds of the electric fan, and access patterns of the storage system;
   (b) selecting one of the storage devices under test;
   (c) selecting one of the fan speeds;
   (d) controlling an electric fan of the storage system to run at the selected fan speed;
   (e) selecting one of the access patterns;
   (f) performing read/write operations on the storage system according to the selected access pattern;
   (g) testing input/output performance of the selected storage device;
   (h) outputting a test result of the selected storage device to an output device;
   (j) repeating block (e) to block (h) until all the access patterns have been selected;
   (k) repeating block (c) to block (j) until all the fan speeds have been selected; and
   (l) repeating block (b) to block (k) until all the storage devices under test have been selected.

7. The method of claim 6, further comprising:
   storing the test result of the selected storage device into a memory.

8. The method of claim 6, wherein each of the storage devices is a hard disk drive, an optical drive, or a tape drive.

9. The method of claim 6, wherein the read/write operation corresponding to the selected access pattern are performed on the selected storage device or all the storage devices.

10. The method of claim 6, wherein the input/output performance of the selected storage device is determined by measuring input/output operations per second and/or a data transfer rate of the selected storage device.

11. A non-transitory storage medium having stored thereon instructions that, when executed by a computerized device, causes the computerized device to execute a rotational vibration test method of a storage system comprising storage devices and an electric fan, the method comprising:
- (a) setting a plurality of test parameters of the storage system, the test parameters comprising storage devices of the storage system under test, fan speeds of the electric fan, and access patterns of the storage system;
- (b) selecting one of the storage devices under test;
- (c) selecting one of the fan speeds;
- (d) controlling an electric fan of the storage system to run at the selected fan speed;
- (e) selecting one of the access patterns;
- (f) performing read/write operations on the storage system according to the selected access pattern;
- (g) testing input/output performance of the selected storage device;
- (h) outputting the test result of the selected storage device to an output device;
- (j) repeating block (e) to block (h) until all the access patterns have been selected;
- (k) repeating block (c) to block (j) until all the fan speeds have been selected; and
- (l) repeating block (b) to block (k) until all the storage devices under test have been selected.

12. The non-transitory medium of claim 11, further comprising: storing the test result of the selected storage device into a memory.

13. The non-transitory medium of claim 11, wherein each of the storage devices is a hard disk drive, an optical drive, or a tape drive.

14. The non-transitory medium of claim 11, wherein the read/write operation corresponding to the selected access pattern are performed on the selected storage device or all the storage devices.

15. The non-transitory medium of claim 11, wherein the input/output performance of the selected storage device is determined by measuring input/output operations per second and/or a data transfer rate of the selected storage device.

* * * * *